United States Patent
Combs et al.

(10) Patent No.: US 6,821,308 B2
(45) Date of Patent: Nov. 23, 2004

(54) POLYOXYALKYLENE MONOETHERS WITH REDUCED WATER AFFINITY

(75) Inventors: George Combs, Downingtown, PA (US); Kenneth G. McDaniel, West Chester, PA (US)

(73) Assignee: Bayer Antwerp N.V., Anterpen (BE)

( * ) Notice: Subject to any disclaimer, the term of this patent is extended or adjusted under 35 U.S.C. 154(b) by 0 days.

(21) Appl. No.: 08/832,167

(22) Filed: Apr. 2, 1997

(65) Prior Publication Data

US 2003/0024154 A1 Feb. 6, 2003

(51) Int. Cl.$^7$ .............................. C10L 1/18; C07C 43/02
(52) U.S. Cl. .................... 44/443; 568/606; 568/608; 568/622; 568/625; 568/658; 568/678; 568/679
(58) Field of Search .......................................... 44/443

(56) References Cited

U.S. PATENT DOCUMENTS

| | | | | |
|---|---|---|---|---|
| 2,807,525 A | * | 9/1957 | Foreman ..................... | 44/443 |
| 3,278,457 A | | 10/1966 | Milgrom ...................... | 260/2 |
| 3,615,295 A | * | 10/1971 | Manary, Jr. .................. | 44/443 |
| 3,901,665 A | * | 8/1975 | Polss .......................... | 44/443 |
| 3,927,994 A | * | 12/1975 | Romans ...................... | 44/443 |
| 3,941,849 A | | 3/1976 | Herold ........................ | 260/607 |
| 4,234,321 A | | 11/1980 | Lilburn ........................ | 44/72 |
| 4,274,837 A | | 6/1981 | Lilburn ........................ | 44/63 |
| 4,288,612 A | | 9/1981 | Lewis et al. ................. | 560/159 |
| 4,384,872 A | * | 5/1983 | Kester et al. ................ | 44/443 |
| 4,422,856 A | | 12/1983 | Maldonado et al. ......... | 44/63 |
| 4,472,560 A | | 9/1984 | Kuyper et al. ............... | 526/120 |
| 4,859,210 A | * | 8/1989 | Franz et al. .................. | 44/443 |
| 4,877,416 A | | 10/1989 | Campbell .................... | 44/62 |
| 5,004,478 A | | 4/1991 | Vogel et al. ................. | 44/398 |
| 5,006,130 A | * | 4/1991 | Aiello et al. ................. | 44/443 |
| 5,010,187 A | | 4/1991 | Heuvelsland ................ | 536/120 |
| 5,158,922 A | | 10/1992 | Hinney et al. ............... | 502/175 |
| 5,298,039 A | | 3/1994 | Mohr et al. .................. | 44/443 |
| 5,427,591 A | | 6/1995 | Cherpeck ..................... | 44/400 |
| 5,470,813 A | | 11/1995 | Le-Khac ...................... | 502/175 |
| 5,482,908 A | | 1/1996 | Le-Khac ...................... | 502/156 |
| 5,600,025 A | | 2/1997 | Buckley, III ................. | 568/716 |

OTHER PUBLICATIONS

Encyclopedia Of Polymer Science & Engineering, 2nd edition, (month unavailable) 1986, vol. 6, "1,2–Epoxide Polymers", pp. 281–282.

* cited by examiner

*Primary Examiner*—Ellen M. McAvoy
(74) *Attorney, Agent, or Firm*—Joseph C. Gil; John E. Mrozinski, Jr.; Lyndanne M. Whalen

(57) ABSTRACT

Oleophilic polyoxyalkylene monoethers having reduced water affinity are disclosed. The monoethers have a hydrocarbyl residue, a polyoxyalkylene moiety, and a hydroxyl end group. The monoethers contain less than about 6 mole percent of alkoxylated unsaturates, and preferably less than about 5 mole percent of polyoxyalkylene diols. The monoethers offer substantial advantages for fuel compositions, particularly reduced water affinity. By using deposit-control additives based on the monoethers, formulators can offer better fuels for cleaner engines.

16 Claims, No Drawings

POLYOXYALKYLENE MONOETHERS WITH REDUCED WATER AFFINITY

FIELD OF THE INVENTION

The invention relates to polyoxyalkylene monoethers. In particular, the invention relates to polyoxyalkylene monoethers with reduced water affinity that have value as components of fuel additive detergent systems.

BACKGROUND OF THE INVENTION

Polyoxyalkylene monoethers and their derivatives are well known and are widely used as components of fuel additive detergent systems to maintain the cleanliness of intake systems in internal combustion engines. Many traditional detergent systems have two components: (1) a polyoxyalkylene component, which acts as a carrier; and (2) a detergent. A wide variety of detergents are known, including carbamates, succinates, amine polyethers, and polyisobutylene amines (PIB amines). Examples of such two-component systems are those shown in U.S. Pat. Nos. 5,298,039 and 4,877,416. More recently, one-component detergent systems that incorporate a polyoxyalkylene moiety and a detergent function into a single polymer backbone have surfaced (see, for example, U.S. Pat. Nos. 5,427,591 and 5,600,025).

Polyoxyalkylene monoethers used as fuel additives must be oleophilic to be compatible with gasolines and the lipophilic detergents used to discourage or eliminate deposit formation. To achieve good solubility in and compatibility with fuels, polyoxyalkylene components are typically terminated with $C_4$-$C_{60}$ (more preferably $C_9$-$C_{30}$) hydrocarbyl (alkyl, aryl, or aralkyl) groups as described, for example, in U.S. Pat. Nos. 5,298,039, 4,877,416, and 4,422,856. Even with the hydrocarbyl groups present, the polyoxyalkylene components can be hydrophilic enough to form emulsions on contact with water in the fuel, or to phase separate from other hydrocarbon components.

To enhance oil-solubility of polyoxyalkylene monoethers, formulators increase the oleophilic nature of the initiator alcohol (see, e.g., U.S. Pat. Nos. 5,298,039 and 5,600,025) or incorporate relatively hydrophobic oxyalkylene units such as those derived from $C_4$ epoxides (see, e.g., U.S. Pat. No. 5,004,478) or branched $C_{11}$-$C_{14}$ epoxides (see, e.g., U.S. Pat. No. 4,274,837). Unfortunately, these modifications are often more costly than desirable.

Polyoxyalkylene monoethers normally contain relatively minor amounts of polyoxyalkylene diol impurities. These diol impurities result from base-catalyzed polymerization of alkylene oxides, e.g., propylene oxide, in the presence of water, which acts as a starter for the polymerization. The diols lack the hydrocarbyl moiety of the monoethers. Until now, these minor amounts of diol impurities were not believed to adversely affect the performance of polyoxyalkylene monoethers in fuels.

Polyoxyalkylene monoethers made with $C_3$ and higher alkylene oxides contain a second type of impurity: alkoxylated unsaturates. A side reaction complicates base-catalyzed polymerization of many alkylene oxides: some of the alkylene oxide isomerizes to an allylic alcohol and other unsaturates under the reaction conditions. For example, propylene oxide isomerizes to allyl alcohol under basic conditions. Reaction of the allylic alcohol with the alkylene oxide gives alkoxylated unsaturates. While these impurities are "monoethers," they lack a relatively hydrophobic end group. Until now, these alkoxylated unsaturates, usually propoxylated allyl alcohols, were not believed to adversely affect the performance of polyoxyalkylene monoethers in fuels.

SUMMARY OF THE INVENTION

The invention is an oleophilic polyoxyalkylene monoether. The monoether has the structure:

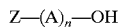

wherein A is an oxyalkylene group, Z is a hydrocarbyl residue selected from the group consisting of $C_4$-$C_{60}$ alkyl, aryl, and aralkyl, and n, which is the average number of oxyalkylene groups, is within the range of about 2 to about 500. The monoether contains less than about 6 mole percent of alkoxylated unsaturates, and preferably less than about 5 mole percent of polyoxyalkylene diols.

We surprisingly found that polyoxyalkylene monoethers containing less than about 6 mole percent of alkoxylated unsaturates offer substantial advantages for fuels. In particular, the monoethers have reduced water affinity and a substantially reduced tendency to form emulsions with water present in lipophilic systems. These advantages of the monoethers suggest better fuel solubility. We also surprisingly found that reducing the content of polyoxyalkylene diol impurities in the monoethers to less than about 5 mole percent offers similar advantages. By using deposit-control additives based on polyoxyalkylene monoethers of the invention, fuel formulators can offer better solutions for cleaner engines.

DETAILED DESCRIPTION OF THE INVENTION

Oleophilic polyoxyalkylene monoethers of the invention have the general structure Z—(A)$_n$—OH, in which A is an oxyalkylene group, Z is a hydrocarbyl residue, and n is the average number of oxyalkylene groups.

Suitable oxyalkylene groups (A) result from ring-opening polymerization of one or more epoxides, including, for example, propylene oxide, butene oxides, pentene oxides, and the like. Preferably, the polyoxyalkylene moiety of the monoether comprises recurring units derived from at least 50 mole percent of propylene oxide, up to about 49 mole percent of butene oxides, and not more than about 10 mole percent of ethylene oxide. Particularly preferred are polyoxyalkylene monoethers in which all of the oxyalkylene units are oxypropylene. The polyoxyalkylene moiety can include a random configuration of oxyalkylene units, or it can be a block copolymer.

The average number of oxyalkylene groups in the monoether, which is represented by "n" in the formula, is within the range of about 2 to about 500. For preferred monoethers, n is within the range of about 5 to about 100. More preferred is the range from about 10 to about 30; most preferred is the range from about 10 to about 25.

The monoethers include a hydrocarbyl residue (Z). The hydrocarbyl residue is a $C_4$-$C_{60}$, more preferably a $C_9$-$C_{30}$, alkyl, aryl, or aralkyl group. The hydrocarbyl residue is generally derived from a monohydroxy compound (e.g., an alcohol or phenol), which is a starter for an epoxide polymerization to make the polyoxyalkylene monoether. Particularly preferred are monoethers that derive from phenols substituted with $C_4$–$C_{15}$ alkyl groups, e.g., nonylphenol, and monoethers that derive from $C_{10}$–$C_{20}$, more preferably $C_{12}$–$C_{15}$, aliphatic alcohols. Examples of generally suitable structures for the polyoxyalkylene monoether appear in U.S. Pat. Nos. 4,234,321, 4,288,612, and 5,600,025, the teachings of which are incorporated herein by reference. Suitable hydrocarbyl residues include "pinwheel" type oxyalkylated alkylphenols such as those described in U.S. Pat. No. 5,600,025.

Polyoxyalkylene monoethers are normally made by basic catalysis, and consequently, they include significant concentrations of alkoxylated unsaturates, typically propoxylated $C_3$ unsaturates. Until now, these impurities were not believed to adversely affect the performance of polyoxyalkylene monoethers in fuels. We surprisingly found, however, that the concentration of alkoxylated unsaturates is important, and that polyoxyalkylene monoethers that contain less than about 6 mole percent of the alkoxylated unsaturates offer substantial advantages for fuels, including reduced water affinity and a reduced tendency to emulsify with water in lipophilic systems. More preferred polyoxyalkylene monoethers contain less than about 3 mole percent of alkoxylated unsaturates; most preferred are monoethers having less than about 1.5 mole percent of alkoxylated unsaturates.

While there are several ways known in the art for making polyether compositions having very low concentrations of alkoxylated unsaturates (i.e., less than about 6 mole percent), a particularly valuable way is to make the polyoxyalkylene component using a double metal cyanide (DMC) catalyst. Suitable DMC catalysts, methods for their manufacture, and procedures for using them to catalyze epoxide polymerizations are described in U.S. Pat. Nos. 3,278,457, 3,941,849, 4,472,560, 5,158,922, 5,470,813, 5,482,908, the teachings of which are incorporated herein by reference. Particularly preferred are polyoxyalkylene monoethers prepared using substantially non-crystalline varieties of double metal cyanide catalysts, since those catalysts tend to give polymers with the lowest levels of alkoxylated unsaturates, typically less than about 3 mole percent, and often less than about 1.5 mole percent.

Preferred polyoxyalkylene monoethers also contain less than about 5 mole percent of polyoxyalkylene diols. Because the alcohol and phenol starters used to make polyoxyalkylene monoethers normally contain appreciable concentrations of water, base-catalyzed alkoxylation of the starter gives the desired monoether, but also gives a significant proportion of polyoxyalkylene diol resulting from epoxide polymerization with water as a starter. Until now, these diol impurities were not believed to adversely affect the performance of polyoxyalkylene monoethers in fuels. We surprisingly found, however, that the concentration of polyoxyalkylene diols is important, and that polyoxyalkylene monoethers that contain less than about 5 mole percent of the diols offer the advantages for fuels described earlier of using monoethers having a low content of alkoxylated unsaturates: reduced water affinity and a reduced tendency to emulsify with water in lipophilic systems. More preferred polyoxyalkylene monoethers contain less than about 2 mole percent of polyoxyalkylene diols.

To produce a polyoxyalkylene monoether having less than about 5 mole percent of polyoxyalkylene diols usually requires vacuum stripping of the starter molecule (alcohol or phenol derived from the hydrocarbyl moiety, Z) to reduce the water content of the starter. The stripping is usually performed at elevated temperature, preferably at a temperature within the range of about 60° C. to about 200° C., more preferably from about 90° C. to about 150° C. Purging the system with an inert gas such as nitrogen often helps to remove water. Azeotroping solvents (e.g., toluene, hexanes) can also be used to help strip out water. Before any epoxide is added to the starter and catalyst, the level of water in the starter is preferably less than about 5 mole percent.

As the results in Table 1 show, reduced water affinity results when the polyoxyalkylene monoethers contain low enough levels of diol and alkoxylated unsaturate impurities. When both diol and alkoxylated unsaturate contents are low, the tendency to form emulsions with water is relatively low. See Examples 1, 2, 5, and 7, in which the diol content is less than 5 mole percent, and the alkoxylated unsaturate content is less than 6 mole percent. Interfacial thickness, which is a measure of the monoether's tendency to form emulsions, is less than 5 mm in each case. In contrast, when the level of diol and/or alkoxylated unsaturate impurities is high (Comparative Examples 3, 4, and 6), the monoethers have a greater tendency to emulsify with water (interfacial thicknesses greater than 10 mm).

The invention includes deposit-control additives based on the polyoxyalkylene monoethers. Two-component deposit-control additives of the invention comprise a detergent and the monoether. Suitable detergents are well-known in the art, and are described, for example, in U.S. Pat. Nos. 5,298,039 and 4,877,416, the teachings of which are incorporated herein by reference. Suitable detergents include, for example, carbamates, succinates, amine polyethers, polyisobutylene amines, and the like, and mixtures thereof. One-component deposit-control additives of the invention incorporate a polyoxyalkylene moiety and a detergent function into a single polymer backbone. Examples of such one-component deposit-control additives appear, for example, in U.S. Pat. Nos. 5,427,591 and 5,600,025, the teachings of which are incorporated herein by reference.

The invention also includes fuel compositions made using the oleophilic polyoxyalkylene monoethers. The fuel compositions comprise a fuel and either a one-component or two-component deposit-control additive of the invention as described above. The fuel compositions may include other additives commonly known in the art, such as, for example, additional detergent additives, anti-knock agents, cetane enhancers, octane enhancers, and the like.

The following examples merely illustrate the invention. Those skilled in the art will recognize many variations that are within the spirit of the invention and scope of the claims.

EXAMPLE A

Preparation of a Polyoxypropylene Monoether from Nonylphenol

Nonylphenol (1006 g) is charged to a stainless-steel reactor. Zinc hexacyanocobaltate-tert-butyl alcohol complex (0.143 g, prepared as described in U.S. Pat. No. 5,482,908) is added, and the mixture is heated with stirring under vacuum at 130° C. for 1 h to remove traces of water from the nonylphenol starter. Propylene oxide (4694 g) is introduced into the reactor over 6 hours. After the epoxide addition is complete, the mixture is heated at 130° C. until no further pressure decrease occurs. The product is vacuum stripped and drained from the reactor.

EXAMPLE B

Preparation of a Polyoxyalkylene Monoether from a $C_{12}$–$C_{15}$ Propoxylate

The procedure of Example A is generally followed, except that a $C_{12}$–$C_{15}$ fatty alcohol is used to initiate the polymerization. The amount of propylene oxide is adjusted to produce a monoether product having the desired number of oxypropylene (PO) units (see Table 1).

EXAMPLE C

Measurement of Mole % Diols and Propoxylated $C_3$ Unsaturates

The mole % of polyoxyalkylene diols and propoxylated $C_3$ unsaturates reported in Table 1 are determined as follows. A polyoxyalkylene monoether sample is derivatized by reacting the hydroxyl groups in the sample with an excess of phthalic anhydride. The sample contains two kinds of "monols" (the desired polyoxyalkylene monoether and propoxylated $C_3$ unsaturates) in addition to polyoxyalkylene "diols." The hydroxyl groups in the sample are converted to phthalate half-esters, which have free —COOH groups. The relative amounts of diol and monols are then quantified by ion chromatography. Because the chromatography method does not distinguish between the two types of monols present, determination of the mole % of propoxylated $C_3$ unsaturates requires a second measurement. Polyol unsaturation, determined in the usual way by mercuric acetate titration, gives the mole % of monol due to the propoxylated $C_3$ unsaturates. Subtracting this value from the total mole % of monol as found by the chromatography method gives the mole % of polyoxyalkylene monoether.

EXAMPLES 1–7

Emulsification Testing for Water Affinity of Polyoxyalkylene Monoethers

Generally, a modified version of ASTM method D-1094-96 is followed. Polyoxypropylene monoether samples (0.02 g) are combined with hexanes (3.6 g) in a screw-capped vial. The capped vial is swirled gently to completely dissolve the polyether. The cap is removed, and water (1.0 g) is added to the hexane solution. The vial is capped and shaken for 2 min. using a piston-like motion that traverses an arc of about 12 inches. The vial is shaken at 2–3 strokes per second for 2 min., and is then allowed to stand undisturbed for 5 min. A ruler is used to measure the height of the interfacial region (emulsified part) in mm after 5 min. and again after 30 min.

TABLE 1

Emulsification Test Results: Polyoxypropylene Monoethers

| Ex. # | Mono-ether | # PO units | Diol (mole %) | $C_3$ olefin (mole %) | Purity (%) | 5 min. IF thick-ness (mm) | 30 min. IF thick-ness (mm) |
|---|---|---|---|---|---|---|---|
| 1 | A | 24 | <0.5 | 0.4 | >99 | 5.6 | 4.0 |
| 2 | B | 18 | <0.5 | 0.5 | >99 | 4.8 | 4.0 |
| C3 | C | 24 | 1.4 | 12.4 | 86 | 13 | 9.5 |
| C4 | D | 17 | <0.5 | 6.8 | 93 | 16 | 13 |
| 5 | E | 18 | 2.4 | 5.5 | 92 | <3.2 | 2.4 |
| C6 | F | 19 | 9.0 | 11 | 80 | 16 | 15 |
| 7 | G | 18 | 3.0 | 0.6 | 96 | 4.0 | 3.2 |

A, B = $C_{12}$–$C_{15}$ alcohol-started; zinc hexacyanocobaltate-tert-butyl alcohol catalyst for propoxylation.
C, D = $C_{12}$–$C_{15}$ alcohol-started; KOH catalyst for propoxylation.
E, F = Nonylphenol-started; KOH catalyst for propoxylation.
G = Nonylphenol-started; zinc hexacyanocobaltate-tert-butyl alcohol catalyst for propoxylation.
IF = interfacial The preceding examples are meant only as illustrations; the following claims define the scope of the invention.

We claim:

1. An oleophilic polyoxyalkylene monoether of the structure:

$$Z—(A)_n—OH$$

in which
   A represents an oxyalkylene group,
   Z represents a hydrocarbyl residue selected from the group consisting of $C_4$–$C_{60}$ alkyl, aryl, and aralkyl, and
   n represents the average number of oxyalkylene groups and is within the range of greater than 17 to about 500,
   wherein the monoether contains less than about 3 mole percent of alkoxylated unsaturates impurities.

2. The monoether of claim 1 in which A represents oxypropylene or a combination of oxypropylene and another oxyalkylene group.

3. The monoether of claim 1 in which Z represents the hydrocarbyl residue of nonylphenol.

4. The monoether of claim 1 wherein Z represents the hydrocarbyl residue of $C_{12}$–$C_{15}$ aliphatic alcohol.

5. The monoether of claim 1 wherein Z is selected from the group consisting of $C_4$–$C_{30}$ alkyl, aryl, and aralkyl.

6. The monoether of claim 1 containing less than about 1.5 mole percent of alkoxylated unsaturates.

7. An oleophilic polyoxyalkylene monoether of the structure:

$$Z—(A)_n—OH$$

in which
   A represents an oxyalkylene group,
   Z represents a hydrocarbyl residue selected from the group consisting of $C_4$–$C_{60}$ alkyl, aryl, and aralkyl, and
   n represents the average number of oxyalkylene groups and is within the range of from about 10 to about 500,
   wherein the monoether contains less than about 0.5 mole percent of alkoxylated unsaturates impurities.

8. The monoether of claim 7 in which A represents oxypropylene or a combination of oxypropylene and another oxypropylene group.

9. The monoether of claim 7 in which Z represents the hydrocarbyl residue of nonylphenol.

10. The monoether of claim 7 in which Z represents the hydrocarbyl residue of a $C_{12}$–$C_{15}$ aliphatic alcohol.

11. The monoether of claim 7 in which Z is selected from the group consisting of $C_4$–$C_{30}$ alkyl, aryl, and aralkyl.

12. The monoether of claim 7 wherein n is from about 10 to about 30.

13. A deposit-control additive comprising the polyoxyalkylene monoether of claim 1.

14. A deposit-control additive comprising the polyoxyalkylene monoether of claim 7.

15. An oleophilic polyoxyalkylene monoether of the structure:

$$Z-(A)_n-OH$$

in which

A represents an oxyalkylene group,

Z represents a hydrocarbyl residue selected from the group consisting of $C_4$–$C_{60}$ alkyl, aryl, and aralkyl, and n represents the average number of oxyalkylene groups and is within the range of greater than 17 to about 500, wherein the monoether is prepared with double metal cyanide catalyst such that the monoether contains less than about 3 mole percent of alkoxoylated unsaturates impurities.

16. An oleophilic polyoxyalkylene monoether of the structure:

$$Z-(A)_n-OH$$

in which

A represents an oxyalkylene group,

Z represents a hydrocarbyl residue selected from the group consisting of $C_4$–$C_{60}$ alkyl, aryl, and aralkyl, and n represents the average number of oxyalkylene groups and is within the range of from about 10 to about 500.

wherein the monoether is prepared with double metal cyanide catalyst such that the monoether contains less than about 0.5 mole percent of alkoxylated unsaturates impurities.

* * * * *